United States Patent
Zhang et al.

(10) Patent No.: US 11,926,369 B2
(45) Date of Patent: Mar. 12, 2024

(54) CAB FRAME, CAB, AND ENGINEERING VEHICLE

(71) Applicant: JIANGSU XCMG CONSTRUCTION MACHINERY RESEARCH INSTITUTE LTD., Xuzhou (CN)

(72) Inventors: Yimin Zhang, Xuzhou (CN); Qiang Fu, Xuzhou (CN); Le Gao, Xuzhou (CN)

(73) Assignee: JIANGSU XCMG CONSTRUCTION MACHINERY RESEARCH INSTITUTE LTD., Xuzhou (CN)

(*) Notice: Subject to any disclaimer, the term of this patent is extended or adjusted under 35 U.S.C. 154(b) by 193 days.

(21) Appl. No.: 17/420,720

(22) PCT Filed: Jul. 2, 2019

(86) PCT No.: PCT/CN2019/094374
§ 371 (c)(1),
(2) Date: Jul. 6, 2021

(87) PCT Pub. No.: WO2020/155553
PCT Pub. Date: Aug. 6, 2020

(65) Prior Publication Data
US 2022/0105995 A1 Apr. 7, 2022

(30) Foreign Application Priority Data

Jan. 29, 2019 (CN) .......................... 201910082731.8

(51) Int. Cl.
*B62D 33/06* (2006.01)
*E02F 9/16* (2006.01)

(52) U.S. Cl.
CPC .......... *B62D 33/0617* (2013.01); *E02F 9/163* (2013.01)

(58) Field of Classification Search
CPC ....... B62D 33/06; B62D 33/0617; E02F 9/08; E02F 9/16; E02F 9/163
USPC ............................ 296/190.01, 190.08, 190.1
See application file for complete search history.

(56) References Cited

U.S. PATENT DOCUMENTS

| | | | | |
|---|---|---|---|---|
| 4,416,486 A * | 11/1983 | McNaught | ......... | B62D 33/0617 180/89.12 |
| 4,652,043 A * | 3/1987 | Hurlburt | ................ | B60J 5/0487 296/202 |
| 8,668,255 B1 * | 3/2014 | Randleman | ............ | B62D 25/07 296/213 |
| 9,273,447 B2 * | 3/2016 | Kimura | .............. | B60H 1/00207 |

(Continued)

FOREIGN PATENT DOCUMENTS

| | | |
|---|---|---|
| CN | 202130513 U | 2/2012 |
| CN | 102874326 A | 1/2013 |

(Continued)

OTHER PUBLICATIONS

First OA received in CN Application No. 201910082731.8; dated Oct. 21, 2023.

*Primary Examiner* — Jason S Daniels

(57) ABSTRACT

A cab frame includes a support framework, where the support framework includes a bottom frame, a top frame, and a four-upright-column structure supported between the bottom frame and the top frame; the four-upright-column structure includes two front upright columns and two rear upright columns, and an inner dimension of the cab frame increases along the bottom-to-top direction.

15 Claims, 8 Drawing Sheets

(56) References Cited

U.S. PATENT DOCUMENTS

| | | | | |
|---|---|---|---|---|
| 9,399,854 | B2* | 7/2016 | Kitashou | E02F 3/7663 |
| 10,287,749 | B2* | 5/2019 | Matsumoto | E02F 9/26 |
| 10,385,538 | B2* | 8/2019 | Wagner | E02F 9/0833 |
| 2007/0273178 | A1* | 11/2007 | Kelley | B62D 33/0617 |
| | | | | 296/190.08 |
| 2009/0223735 | A1* | 9/2009 | Ruhter | E02F 9/16 |
| | | | | 180/333 |
| 2014/0225397 | A1* | 8/2014 | Gielda | B62D 33/0617 |
| | | | | 296/190.03 |
| 2015/0000996 | A1* | 1/2015 | Nagami | E02F 9/163 |
| | | | | 296/190.08 |
| 2015/0298748 | A1* | 10/2015 | Kitashou | E02F 3/7654 |
| | | | | 296/190.08 |
| 2015/0298749 | A1* | 10/2015 | Zurinski | B60H 1/00207 |
| | | | | 296/190.08 |
| 2017/0058483 | A1* | 3/2017 | Hart | E02F 3/764 |

FOREIGN PATENT DOCUMENTS

| | | | |
|---|---|---|---|
| CN | 202953056 U | 5/2013 | |
| CN | 204626498 U | 9/2015 | |
| CN | 105564516 A | 5/2016 | |
| CN | 205273641 U | 6/2016 | |
| CN | 107882099 A | 4/2018 | |
| EP | 842842 A2 * | 5/1998 | A01D 67/02 |
| WO | 2013094893 A1 | 6/2013 | |

* cited by examiner

CAB FRAME, CAB, AND ENGINEERING VEHICLE

CROSS-REFERENCES TO RELATED APPLICATIONS

The present disclosure is a national phase application of International Application No. PCT/CN2019/094374, filed on Jul. 2, 2019, which claims priority to Chinese Patent Application No. 201910082731.8, filed on Jan. 29, 2019, the entireties of which are herein incorporated by reference.

FIELD

The present disclosure relates to the field of engineering vehicles, and in particular to a cab frame, a cab and an engineering vehicle.

BACKGROUND

Engineering vehicles usually have higher requirements for the visual field and internal activity space of the cabs. A grader is taken as an example, which is a engineering vehicle for leveling a road surface. During working, the operator in the cab needs to control the blade operating device while carefully observing the road surface which has been leveled. Therefore, the visual field of the cab (including the visual field of the blade operating device, the visual field of forward movement, and the rear visual field) and the movement space of the operator head in the cab have become important factors affecting the efficiency and safety of the grader.

However, the existing cab is usually a six-upright structure, and the upper and lower dimensions of the cab are basically consistent, and has problems such as obstruction to the visual field of the cab by the uprights and the baseplate and the insufficient inner movement space for the operator head, and thus operating efficiency is low and operating safety is weak.

SUMMARY

A problem to be solved by the present disclosure is to broaden the visual field of a cab and improve driving comfort.

In order to solve the above-mentioned problems, one embodiment of the present disclosure provide a cab frame, and the cab frame includes a support framework, where the support framework includes a bottom frame, a top frame, and a four-upright-column structure supported between the bottom frame and the top frame; the four-upright-column structure includes two front upright columns and two rear upright columns, and an inner dimension of the cab frame increases along a bottom-to-top direction.

In some embodiments of the present disclosure, the cab frame further includes: a top skin portion wrapped outside the top frame, a dimension of the top skin portion being larger than that of the bottom frame; and/or a rear skin portion wrapped outside the rear portion of the support framework, at least a lower portion of the rear skin portion inclining backwards in the bottom-to-top direction.

In some embodiments of the present disclosure, the rear edge of the top skin portion is arranged rearward than that of the bottom frame.

In some embodiments of the present disclosure, a rear edge of the top skin portion is arranged rearward than that of the top frame, and the rear edge of the top frame approximately flushes with that of the bottom frame in a front-rear direction.

In some embodiments of the present disclosure, the top frame is in a shape of a hexagon, and the hexagon includes a trapezoid which is located at front and tapers from rear to front and a rectangle at rear; the top skin portion is in the shape of an octagon, and the octagon includes a trapezoid which is located at the front and tapers from rear to front, a rectangle in the middle, and a trapezoid which is located at the rear and tapers from front to rear.

In some embodiments of the present disclosure, the cab frame further includes a rear skin portion which is wrapped outside a rear portion of the support framework, and the rear skin portion protrudes backwards from the rear portion of the support framework.

In some embodiments of the present disclosure, a rear glass installation portion is provided on the rear skin portion.

In some embodiments of the present disclosure, the front upright columns are thinner than the rear upright columns.

In some embodiments of the present disclosure, the two front upright columns are located between the front and rear ends of the bottom frame.

In some embodiments of the present disclosure, the bottom frame is shaped as a hexagon, and the hexagon includes a trapezoid which is located at the front and tapers from back to front and a rectangle at the rear; and the front upright columns are located on two middle vertices of the bottom frame.

In some embodiments of the present disclosure, the cab frame includes a front glass installation portion, the front glass installation portion is in front of the front upright columns and extends from the top frame to the bottom frame in a height direction.

In some embodiments of the present disclosure, the front glass installation portion gradually inclines outwards in the bottom-to-top direction.

In some embodiments of the present disclosure, and the bottom frame is in the shape of a hexagon, and the hexagon includes a trapezoid which is located at front and tapers from rear to front and a rectangle at rear; the two front upright columns are located on two middle vertices of the bottom frame; the two rear upright columns are located on two rear vertices of the bottom frame; the front glass installation portion includes a direct front glass installation portion, a left front glass installation portion and a right front glass installation portion, the direct front glass installation portion is located between two front vertices of the bottom frame, the left front glass installation portion and the right front glass installation portion are respectively located at left and right sides of the direct front glass installation portion and are both between the front vertices of the front upright column located at corresponding side and the bottom frame.

In some embodiments of the present disclosure, along the bottom-to-top direction, a width of the direct front glass installation portion decreases gradually, and widths of the left front glass installation portion and right front glass installation portion increases gradually.

In some embodiments of the present disclosure, the cab frame includes door installation portions, and the door installation portions include: a left door installation portion located between the front upright column on a left side and the rear upright columns on a left side; and/or a right door installation portion located between the front upright column on a right side and the rear upright columns on a right side.

Another embodiment of the present disclosure also provides a cab, and the cab includes the cab frame of the present disclosure.

In some embodiments of the present disclosure, the cab includes a front glass, the front glass includes a direct front glass, a left front glass and a right front glass, the direct front glass is installed on a direct front glass installation portion of a front glass installation portion of the cab frame, the left front glass is installed on a left front glass installation portion of the front glass installation portion, and the right front glass is installed on a right front glass installation portion of the front glass installation portion, and the cab further includes a wiper structure with two wipers arranged on the left front glass and/or two wipers arranged on the right front glass.

In yet another embodiment of the present disclosure also provides an engineering vehicle, and the engineering vehicle includes the cab of the present disclosure.

In some embodiments of the present disclosure, the engineering vehicle is a grader.

As the cab frame is configured as a four-upright support structure with a large upper portion and a small lower portion, the cab is provided with a smaller dimension of the lower portion, a larger dimension of the upper portion, and fewer uprights at the same time, which reduces visual field obstruction arising from a baseplate and uprights and provides sufficient movement space for an operator head. Therefore, in the present disclosure, the visual field of the cab can be enlarged and the driving comfort is improved.

The exemplary embodiments of the present disclosure are described in detail with reference to the accompanying drawings, so that other features and embodiments of the present disclosure will become apparent.

BRIEF DESCRIPTION OF THE DRAWINGS

In order to explain the embodiments of the present disclosure more clearly, the following will briefly describe the accompanying drawings that need to be used either the embodiments. Apparently, the accompanying drawings in the following descriptions are merely some embodiments of the present disclosure.

DETAILED DESCRIPTION OF THE DISCLOSURE

Figure 1:
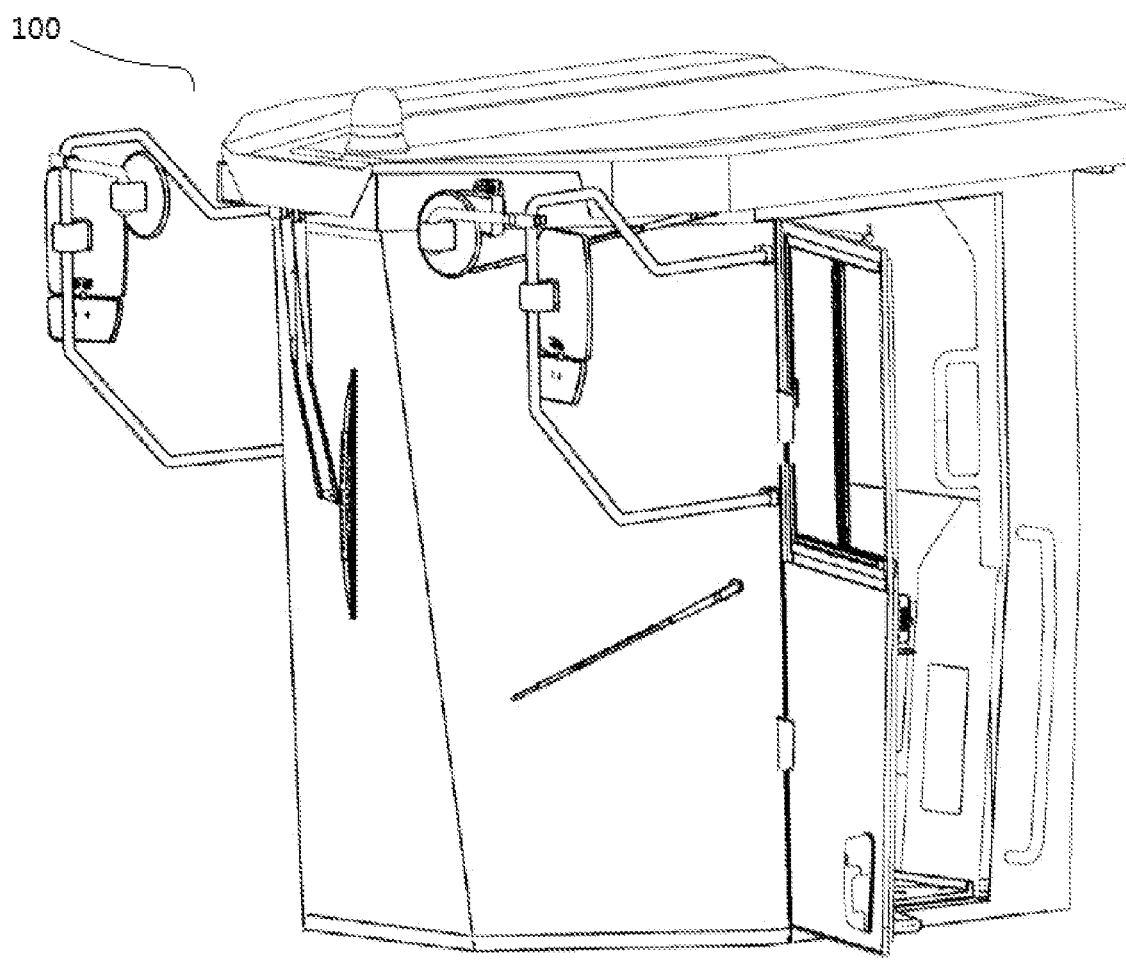
FIG. 1 illustrates a three-dimensional schematic diagram of a view angle of a cab according to an embodiment of the present disclosure.

The following clearly and completely describes the solutions in the embodiments of the present disclosure with reference to the accompanying drawings in the embodiments of the present disclosure. Apparently, the described embodiments are only some but not all of the embodiments of the present disclosure. Actually, the following description of at least one exemplary embodiment is merely illustrative, which is not intended for limiting the present disclosure, and the application or use thereof.

Technologies, methods, and equipment known in the related art may not be discussed in detail, but where appropriate, they should be considered as a part of the authorized specification.

It needs to be understood that, in the descriptions of the present disclosure, the orientation or position relationship indicated by orientation words such as "front, back, up, down, left and right", as well as "transverse, longitudinal, vertical and horizontal" and "top and bottom" is usually based on the one as shown in the drawings, only for the purpose of facilitating and simplifying the descriptions of the present disclosure. Unless otherwise stated, these orientation words do not indicate or imply that targeted devices or elements must have a specific orientation or be constructed and operated in a specific orientation, and thus cannot be understood as a limitation to the protection scope of the present disclosure. The orientation words "inside and outside" refer to the inside and outside relative to the profile of each component itself.

In the descriptions of the present disclosure, it should be understood that terms such as "first" and "second" are used to define parts, only for the ease of distinguishing the corresponding parts. Unless otherwise stated, the terms have no special meanings, and therefore cannot be understood as a limitation to the protection scope of the present disclosure.

In addition, the features included in different embodiments of the present disclosure described below may be combined with each other, provided that there is a conflict therein.

FIGS. 1-9 illustrate a schematic structural diagram of a cab and cab frame in an embodiment of the present disclosure.

Referring to FIGS. 1-9, the cab frame 10 provided by the present disclosure includes a support framework 1, the support framework 1 includes a bottom frame 11, a top frame 12, and a four-upright-column structure 13 supported between the bottom frame 11 and the top frame 12, the four-upright-column structure 13 includes two front upright columns 131 and two rear upright columns 132, and the inner dimension of the cab frame 10 increases along a bottom-to-top direction.

In the present disclosure, the cab frame 10 is configured into a four-upright frame structure with a large upper portion and a small lower portion. On the one side, compared with the existing frame structure with the same upper and lower dimensions, the dimension of the baseplate is reduced without affecting or even increasing the upper space in the cab, therefore, not only obstruction to a blade operating device by the front portion of the baseplate is reduced, but also sufficient movement space for an operator head is provided. On the other side, with respect to the existing six-upright frame structure, the uprights are reduced in quantity and more flexible in arrangement, therefore, it is also conducive to reducing obstruction to the visual field of the cab by the uprights.

As can be seen, the present disclosure reduces visual field obstruction arising from a baseplate and uprights and provides sufficient movement space for the operator head, and effectively broadening the visual field of the cab and improving the driving comfort, and the grader and other engineering vehicles can operate more efficiently and safely.

In addition to the support framework 1, the cab frame 10 of the present disclosure may further include an exterior skin 2 wrapped outside the support framework 1. The exterior skin 2 can increase the aesthetics of the cab frame 10.

As an implementation manner for gradually increasing the inner dimension of the cab frame 10 in the bottom-to-top direction, in the present disclosure, a top skin portion 21 of the exterior skin 2, wrapped outside the top frame 12, is configured with a dimension greater than that of the bottom frame 11. To be specific, either the dimensions of the top skin portion 21 and top frame 12 are greater than that of the bottom frame 11, or the dimension of the top skin portion 21 is greater than that of the bottom frame 11, while the dimension of the top frame 12 is still approximately equal to that of the bottom frame 11. As can be seen, based on this implementation manner, even if the existing structure of the top frame 12 is not changed, that is, even if the dimension of the top frame 12 and bottom frame 11 is still basically consistent, the cab frame 10 can still have internal space with a large upper portion and a small lower portion, thus it is conducive to reducing the cost of improvement and the difficulty of improvement.

As another implementation manner for gradually increasing the inner dimension of the cab frame 10 in the bottom-to-top direction, in the present disclosure, a rear skin portion 22 of the exterior skin 2, wrapped outside the rear portion of the support framework 1, is configured into a structure that a lower portion of the rear skin portion 22 inclines backwards in the bottom-to-top direction, in other words, at least lower portion thereof inclines forwards in the top-down direction. To be specific, the rear skin portion 22 inclines backwards in the bottom-to-top direction as a whole, or only the lower portion thereof inclines backwards in the bottom-to-top direction, and the upper portion thereof remains approximately vertical. In this case, the support framework 1 still remains the existing structural form with the same upper and lower dimensions, and the bottom-to-top inner space of the cab frame 10 is gradually increased through the rear skin portion 22 inclining backwards in the bottom-to-top direction, which is also conducive to reducing the cost of improvement and the difficulty of improvement. At the same time, the lower portion of the rear skin portion 22, which gradually inclines forwards from top to bottom instead of being vertical, forms an avoidance to a rear hood of the cab, and interference between the cab 100 and the hood is reduced, to facilitate the arrangement of the whole structure.

As can be seen, the improvement in the structure of the exterior skin 2 can enable the cab frame 10 to have inner space with a large upper portion and a small lower portion with less change in the existing structure of the support framework 1, thus the cost of improvement is saved, and the difficulty of improvement is reduced.

In the existing six-upright cab frame, the front upright columns are usually arranged on the front vertices of the hexagonal bottom frame, in this case, the front column is arranged forward, and the distance between the two front upright columns is small, thus causing more obstruction to the blade operating device and the moving visual field directly in front of the operator, and affects the operation efficiency and the safety of operation and movement. For the purpose of further solving this problem, in the present disclosure, the front upright columns 31 are arranged between front and rear ends of the bottom frame 11 other than the front end of the bottom frame 11, specifically, the front upright columns 31 are arranged on the middle apex of the hexagonal bottom frame 11, in this way, the front upright columns 131 are rearward and the distance between the front upright columns 131 is relatively large, so that obstruction to the direct front visual field of the cab by the front upright columns 131 is reduced, and obstruction to the blade operating device and other operating devices by the front upright columns 131 is further reduced, to expand the visual field of the operating devices and the forward visual field of the straight forward movement in a more efficient manner, further improve the operation efficiency of the engineering vehicle, and improve the safety of operation and driving.

In addition, in the prior art, the front glass of the cab is usually not of the floor-to-ceiling glass and has small visible area, which also limits the visual field of the cab. Therefore, in order to avoid this problem, in the cab frame 10 of the present disclosure, a front glass installation portion 14 located in front of the front upright columns 131 extends from the top frame 12 to the bottom frame 11 in the height direction. In this case, the cab 100 is provided with floor-to-ceiling front glass with a larger viewing area, thus the visual field of the cab is further expanded.

The space of the cab frame 10 in front of the front upright columns 131 is partly configured as the front glass installation portion 14, or the space in front of the front upright 131 of the cab frame 10 is integrally configured as the front glass installation portion 14. The front glass of the latter has a larger area, and thus the latter is wider in visual field, and the front glass of the latter not only includes direct front glass, but also includes a left front glass and a right front glass, which is convenient for the driver to observe from different viewing angles such as front, left and right directions.

In addition, in the present disclosure, the front glass installation portion 14 is further configured to gradually incline outwards in the bottom-to-top direction, so that the size of the upper part of the cab is larger than that of the lower part, which is convenient for the head of the operator to move more flexibly and at the same time, the front glass avoids blades and other operating devices in front of the cab, and facilitating the arrangement of the blades, other operating devices and the cab.

The following gives a further description to the present disclosure in conjunction with the embodiment as shown in FIGS. 1-9. In this embodiment, the cab of the grader is taken as an example.

As shown in FIGS. 1-5, in this embodiment, the cab 100 includes a cab frame 10, a front glass 3, doors 4, a rear glass 5, an exterior structure and an interior structure 7. The front glass 3, the doors 4 and the rear glass 5 are arranged on the front glass installation portion 14, the door installation portion 15 and a rear glass installation portion of the cab frame 10 respectively. The exterior structure is arranged outside the cab frame 10, and includes a rearview mirror, a warning light, an overhead guard 62, a wiper structure with wipers 61. The interior structure 7 is arranged inside the cab frame 10.

As shown in FIGS. 5-9, in this embodiment, the cab frame 10 includes a support framework 1 and an exterior skin 2. The exterior skin 2 is wrapped outside the support framework 1, and is configured to define the inner space of the cab frame 10 together with the support framework 1.

Figure 7:
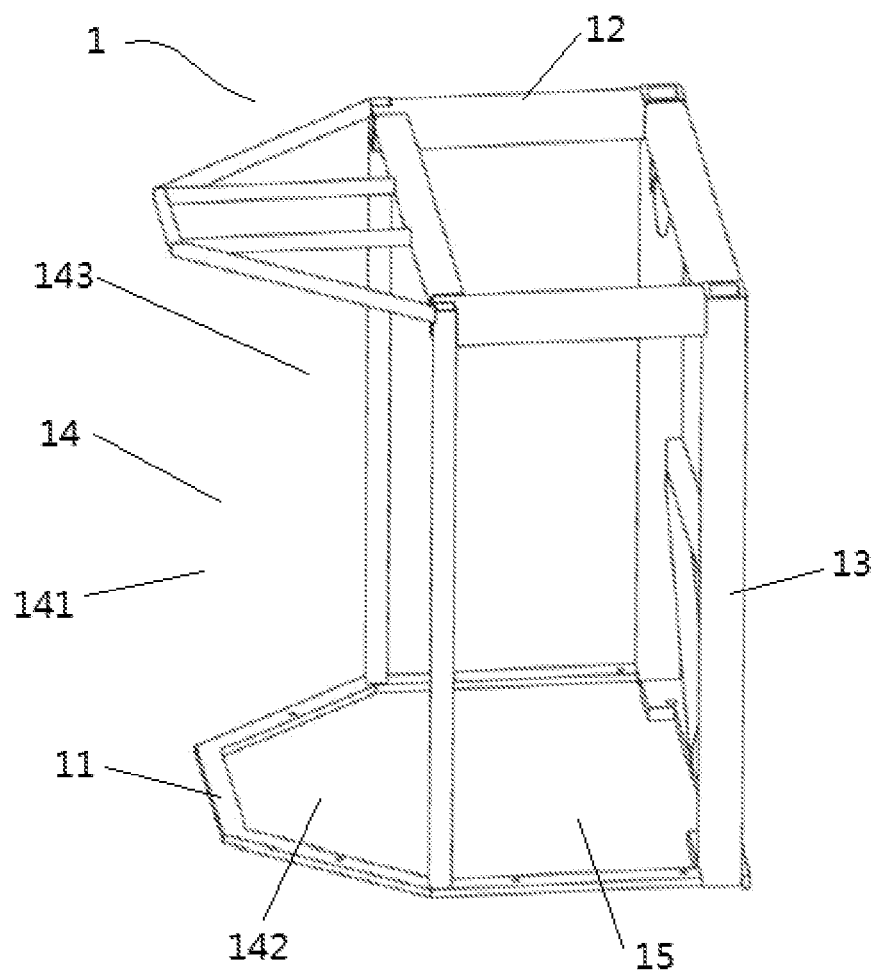
FIG. 7 illustrates a three-dimensional schematic diagram of a support framework as shown in FIG. 6.
Figure 8:
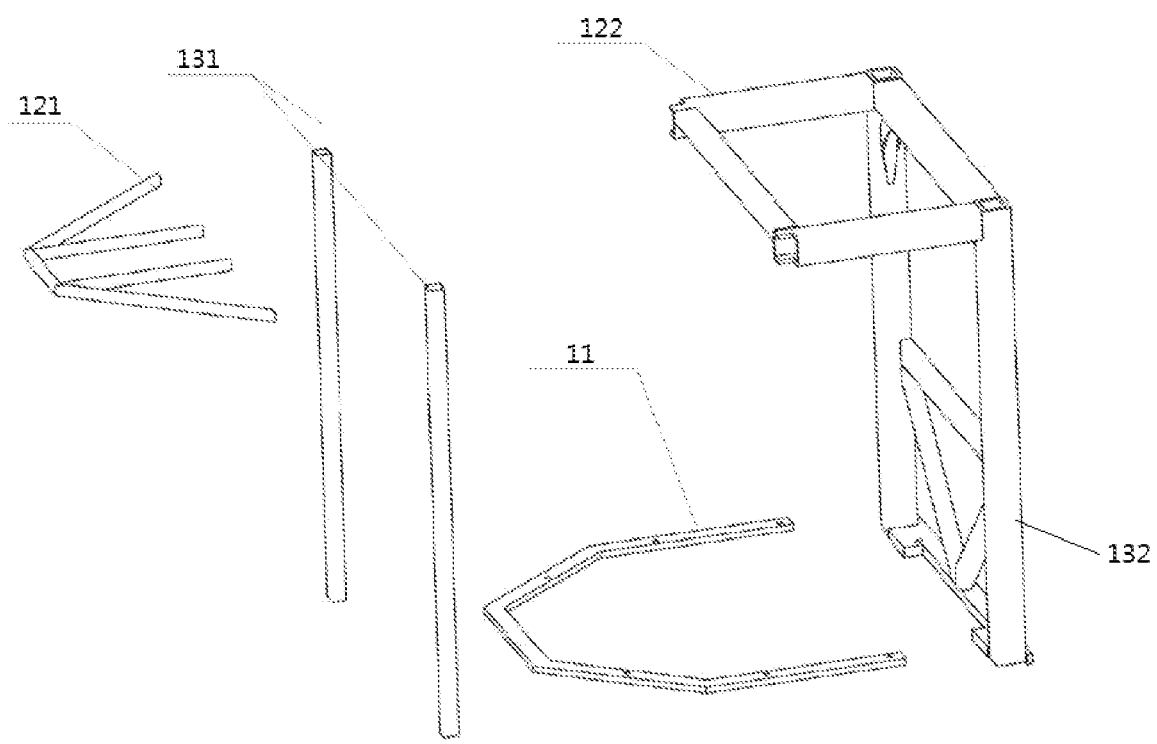
FIG. 8 illustrates a breakdown view of a support framework as shown in FIG. 7.

As can be seen from FIG. 7 and FIG. 8, the support framework 1 of this embodiment includes a bottom frame 11, a top frame 12, and a four-upright-column structure 13. The bottom frame 11 and the top frame 12 are arranged relatively with an up-down interval. The four-upright-column structure 13 is supported between the bottom frame 11 and the top frame 12, and includes two front upright columns 131 and two rear upright columns 132.

The bottom frame 11 and the top frame 12 are both shaped as a hexagon, the hexagon includes a trapezoid and a rectangle successively connected from front to rear, and the trapezoid in the front gradually tapers from rear to front, that is, the short edge of the trapezoid is located in front of the long edge thereof. In addition, the short edges of the trapezoids of the bottom frame 11 and the top frame 12 are approximately parallel, and the rear edges of the top frame 12 and bottom frame 11 are approximately flush. Based on this, the bottom frame 11 and the top frame 12 both have two front vertices, two middle apexes and two rear vertices, the distance between the two front vertices is relatively narrow, and the distance between the two middle apexes is approximately equal to that between the two rear vertices, both of which are relatively wide.

As shown in FIG. 8, in this embodiment, the bottom frame 11 is a central hollow structure, that is, the middle portion of the bottom frame 11 is not provided with a baseplate, and the baseplate is located on the body frame of the grader. After the cab 100 is installed, the baseplate is fitted into the hollow portion of the bottom frame 11.

The top frame 12 includes a first top frame 121 and a second top frame 122 that are successively arranged in a front-to-rear direction and connected with each other. The first top frame 121 is in the shape of a trapezoid, and the second top frame 122 is in the shape of a rectangle. As shown in FIG. 8, the second top frame 122 and the rear upright columns 132 are connected (for example, welded) as a whole to form a structure of preventing the rear upright columns from turnover, for the purpose of avoiding turnover and falling objects. The uprights corresponding to all sides of the second top frame 122 are thicker than the uprights corresponding to all sides of the first top frame 121.

Referring to FIGS. 7-8, in this embodiment, the two front upright columns 131 are located on two middle apexes of the bottom frame 11, and the two rear upright columns 132 are located on two rear vertices of the bottom frame 11.

Compared with the case that the two front upright columns 131 are arranged on two front vertices of the bottom frame 11, when the two front upright columns 131 are arranged on two middle apexes of the bottom frame 11, the two front upright columns 131 are located rearward, and the distance between the two front upright columns 131 is wider, therefore, obstruction to the visual field of the blade operating device and the visual field of forward movement by the front upright columns 131 is effectively reduced, and an area of the front glass 3 secured in front of the front upright columns 131 is enlarged (this will be further described below in conjunction with the arrangement of the front glass installation portion 14 and the front glass 3), which further improves the visual field of the cab 100.

As can be seen, in this embodiment, the visual field of the cab can be effectively improved by the setting position of the two front upright columns 131.

In addition, as shown in FIGS. 7-8, in this embodiment, the front upright columns 131 are thinner than the rear upright columns 132. In this way, for one thing, the front upright columns 131 are thinner, thus obstruction to the visual field of the cab is further reduced; for another thing, the rear upright columns 132 are thicker, thus the structural stability of the cab frame 10 is enhanced, and the rear upright columns 132 plays a better role in avoiding turnover and falling objects together with the second top frame 122. As can be seen, such configuration can optimize the visual field of the cab on the basis of ensuring the structural stability of the cab.

Referring to FIGS. 1-7, in this embodiment, the space of the cab frame 100, in front of the front upright columns 131 and between the top frame 121 (especially the first top frame 121) and the bottom frame 11, is configured integrally as the front glass installation portion 14, so that the front glass installation portion 14 not only includes a direct front glass installation portion 141, but also includes a left front glass installation portion 142 and a right front glass installation portion 143. The direct front glass installation portion 141 is located between two front vertices of the bottom frame 11. The left front glass installation portion 142 and the right front glass installation portion 143 are respectively located on left and right sides of the direct front glass installation portion 141, and both located between the front vertices of the front upright columns 131 and the bottom frame 11 that are located on corresponding sides thereof. Moreover, the direct front glass installation portion 141, the left front glass installation portion 142 and the right front glass installation portion 143 all extend from the top frame 12 to the bottom frame 11 in a height direction. Accordingly, the front glass 3 not only includes a direct front glass 31 installed on the direct front glass installation portion 141, but also includes a left right glass 32 installed on the left front glass installation portion 142 and a right front glass 33 installed on the right front glass installation portion 143, and the direct front glass 31, the left right glass 32 and the right front glass 33 are all of floor-to-ceiling glass.

With respect to a case that the front glass 3 only includes the direct front glass 31, when the front glass 3 is configured to include the direct front glass 31, the left front glass 32 and the right front glass 33 at the same time, where the left front glass 32 and the right front glass 33 are located on left and right sides of the direct front glass 31, the area of the front glass 3 is effectively enlarged in left and right directions, so that a driver can observe the circumstances outside the cab not only from the direct front direction, but also from a left front direction and a right front direction, and facilitating the driver to carry out a multi-angle observation according to different operating conditions to obtain relatively clear and accurate observation results.

In addition, by configuring the entire of the front glass 3 as floor-to-ceiling glass, the area of the front glass 3 is further increased in the height direction, and facilitating the driver to more fully observe the blade operating device and the surrounding environment and carry out driving and operation in a safer manner.

As can be seen, the arrangement of the front glass installation portion 14 of this embodiment results in that the cab 100 has a front glass 3 with larger area, the visual field of the cab such as the visual field of the blade operating device and the visual field of forward movement is wider, and the efficiency and safety of driving and operation is higher.

Figure 3:
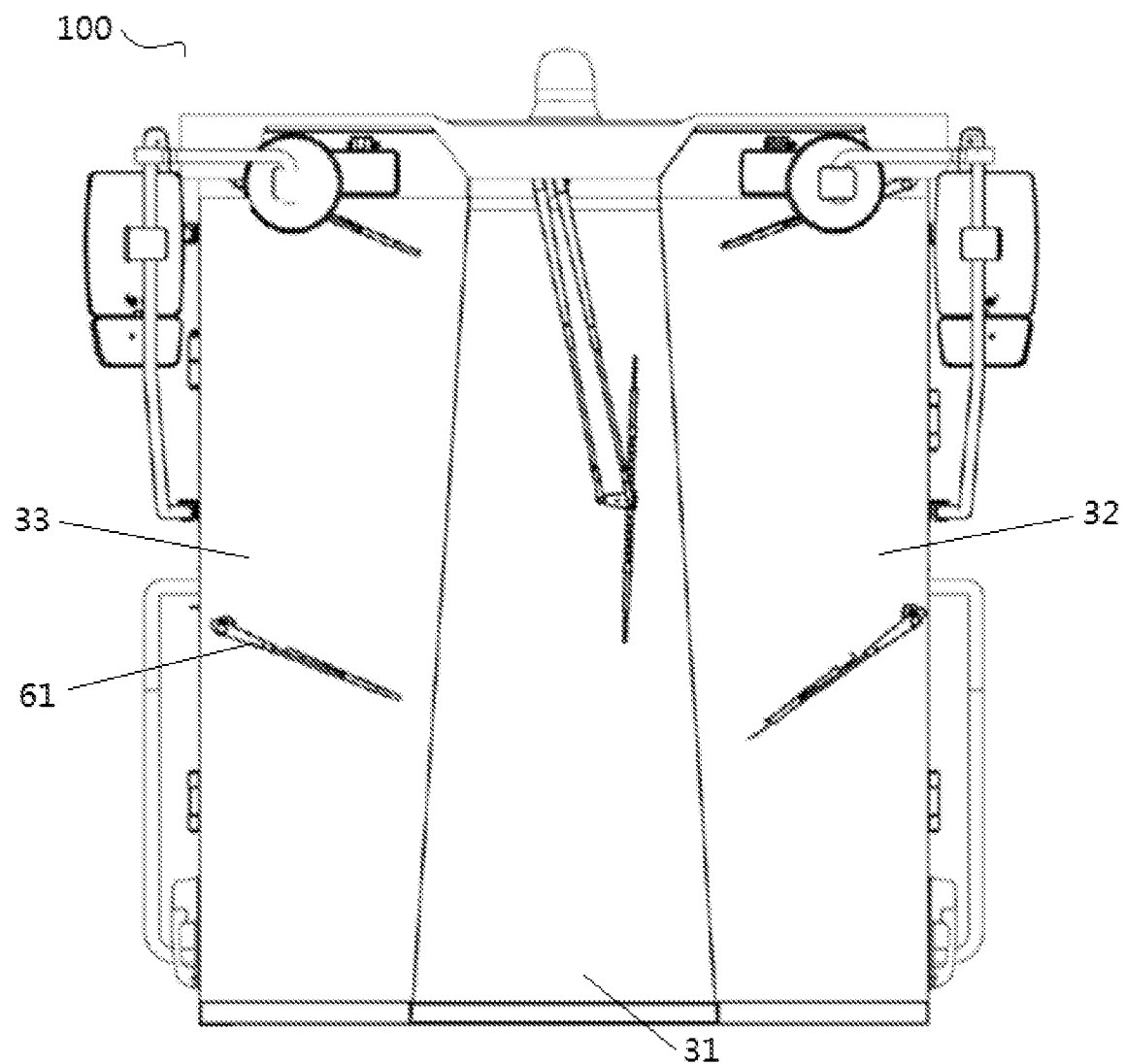
FIG. 3 illustrates a front view of the cab as shown in FIG. 1.

In addition, referring to FIG. 3, in this embodiment, the short edge of the trapezoid of the top frame 12 is shorter than that of the bottom frame 11, and in the bottom-to-top direction, the width of the direct front glass installation portion 141 decreases gradually, and the width of the left front glass installation portion 142 and the right front glass installation portion 143 increases gradually, that is, the width of the direct front glass 31 gradually decreases, and the width of the left front glass 32 and the right front glass 33 gradually increases. In such arrangement, a width change trend for these three pieces of front glass along the up-down direction is more in line with the driver observation requirements for three different viewing angles such as direct front direction, right front direction and left front direction, and with respect to a case that the direct front glass widens and the left front glass and the right front glass narrows from bottom to top, more useful observation visual field and head movement space can be obtained under the same glass area.

The front glass 3 as shown in FIGS. 1-5 which is composed of three pieces of plain glass is more easy to meet an angle position relationship among the direct front glass installation portion 141, the left front glass installation portion 142 and the right front glass installation portion 142, thus the front glass 3 is easy to process and low in cost. However, in other embodiments of the present disclosure, the front glass 3 may be of curved (for example, cambered) glass; in this case, three pieces of glass in illustrated embodiments can be replaced with a complete piece of glass.

Figure 5:
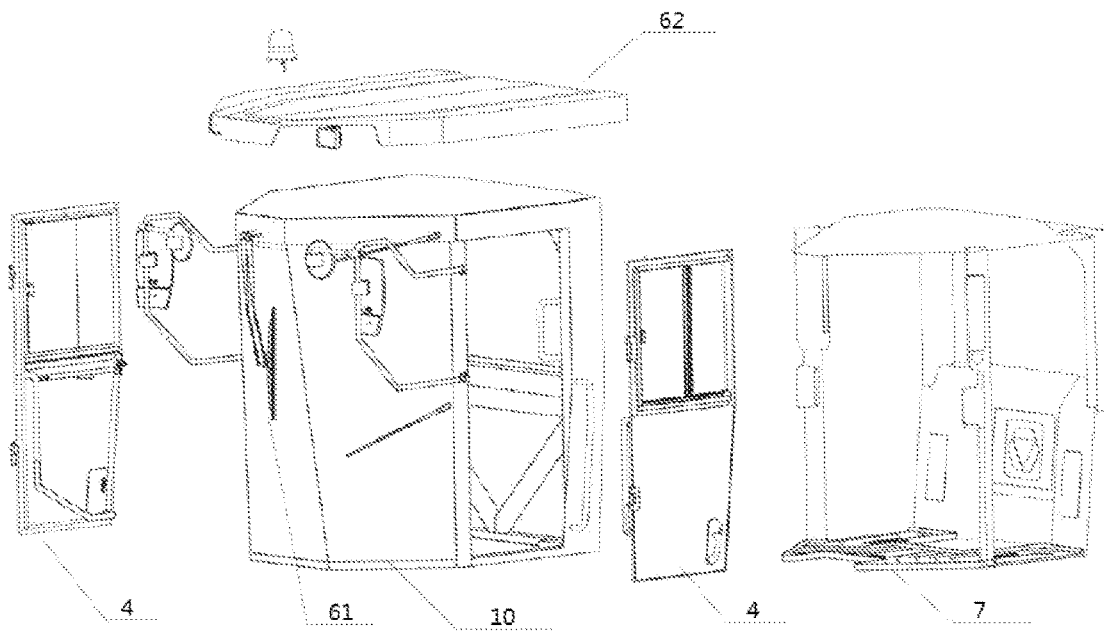
FIG. 5 illustrates a breakdown view of the cab as shown in FIG. 1.
Figure 6:
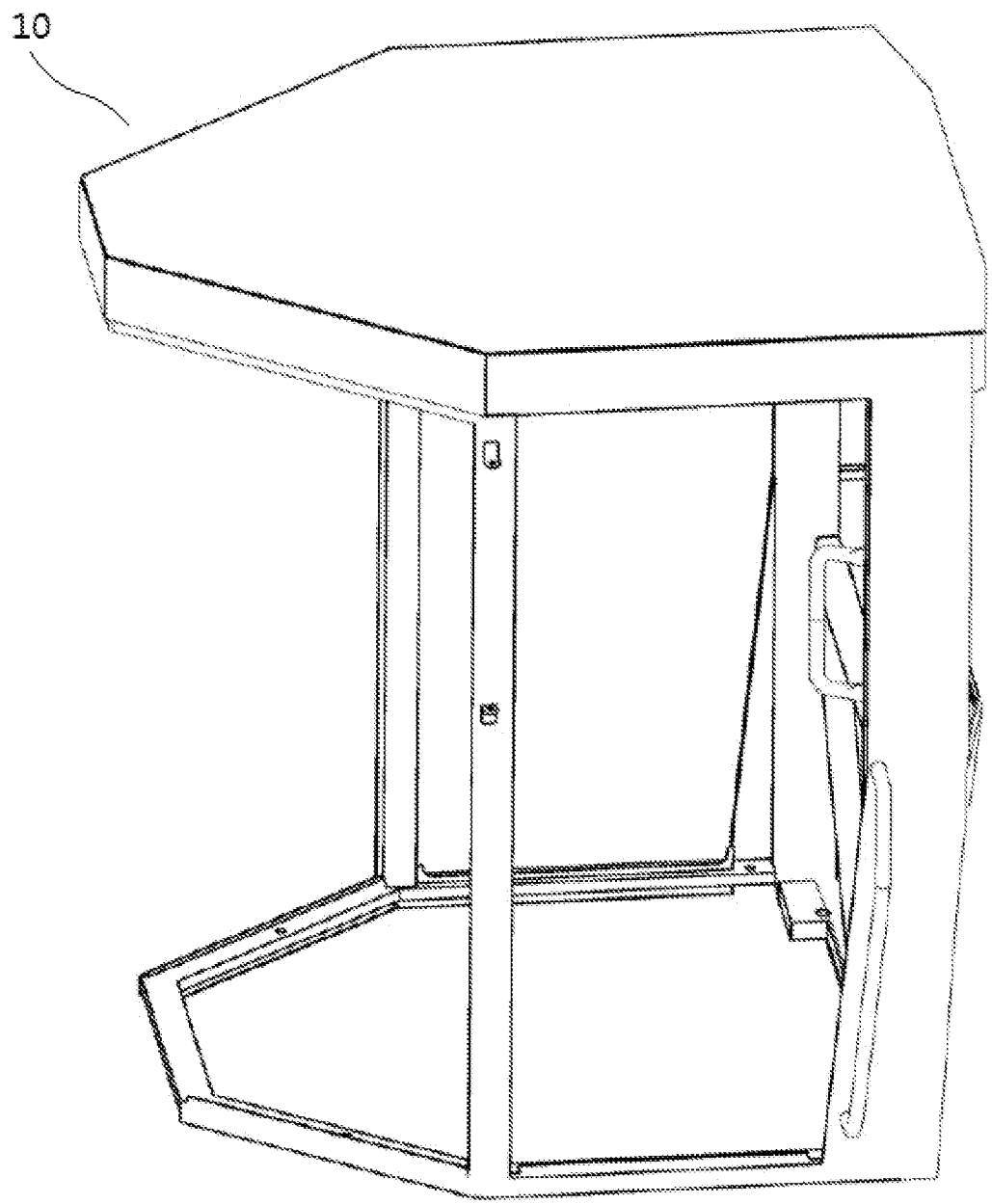
FIG. 6 illustrates a three-dimensional schematic diagram of a cab frame in FIG. 5.

Referring to FIGS. 5-6, in this embodiment, the door installation portions 15 of the cab frame 10 include a left door installation portion and a right door installation portion. The left door installation portion is located between the front upright columns 131 and the rear upright columns 132 on a left side. The right door installation portion is located between the front upright columns 131 and the rear upright columns 132 on a right side. Accordingly, the cab includes two doors 4, where one of the doors 4 is installed on the left door installation portion and used as a left door, while the other thereof is installed on the right door installation portion and used as a right door. The left door is hinged to the left front upright column, and the right door is hinged to the right front upright column, so that the left door and the right door both open forwards, as shown in FIG. 1.

The door installation portions are arranged on both left and right sides, the cab 100 of this embodiment can meet the requirements of getting on and off the vehicle from left and right sides, therefore, with respect to a case that only the door is arranged on one side, it's more convenient and flexible for the driver to get on and off the vehicle, especially when one door fails to be opened due to faults or dangers on any one of sides, the driver can select get off the vehicle from the other side, and thus the cab is suitable to more operating conditions and safer in use.

Compared with a case where the doors are opened backwards, when the doors are opened forwards in this embodiment, interfering between the doors and the hood when the doors are opened is avoided, and the doors are more convenient to open and close.

In addition, sliding windows are installed on the upper portions of the doors 4, for the convenience of ventilation and improvement of air quality inside the cab; at the same time, this also helps the driver to observe external circumstances especially in the process of getting on/off.

In addition, as shown in FIGS. 1 and 6, in this embodiment, the inner dimension of the cab frame 10 gradually increases from bottom to top, so that the entire inner space of the cab 100 is in an inverted tower-shaped structure with a large upper portion and a small lower portion; this not only reduces obstruction to the blade operating device by the baseplate of the cab, but also increases the movement space of the upper body of the driver with the convenience of driver head movement and the improvement of the driving comfort.

In this embodiment, some improvements in the support framework 1 and the exterior skin 2 are made, to gradually increase the inner dimension of the cab frame 10 from bottom to top.

Figure 4:
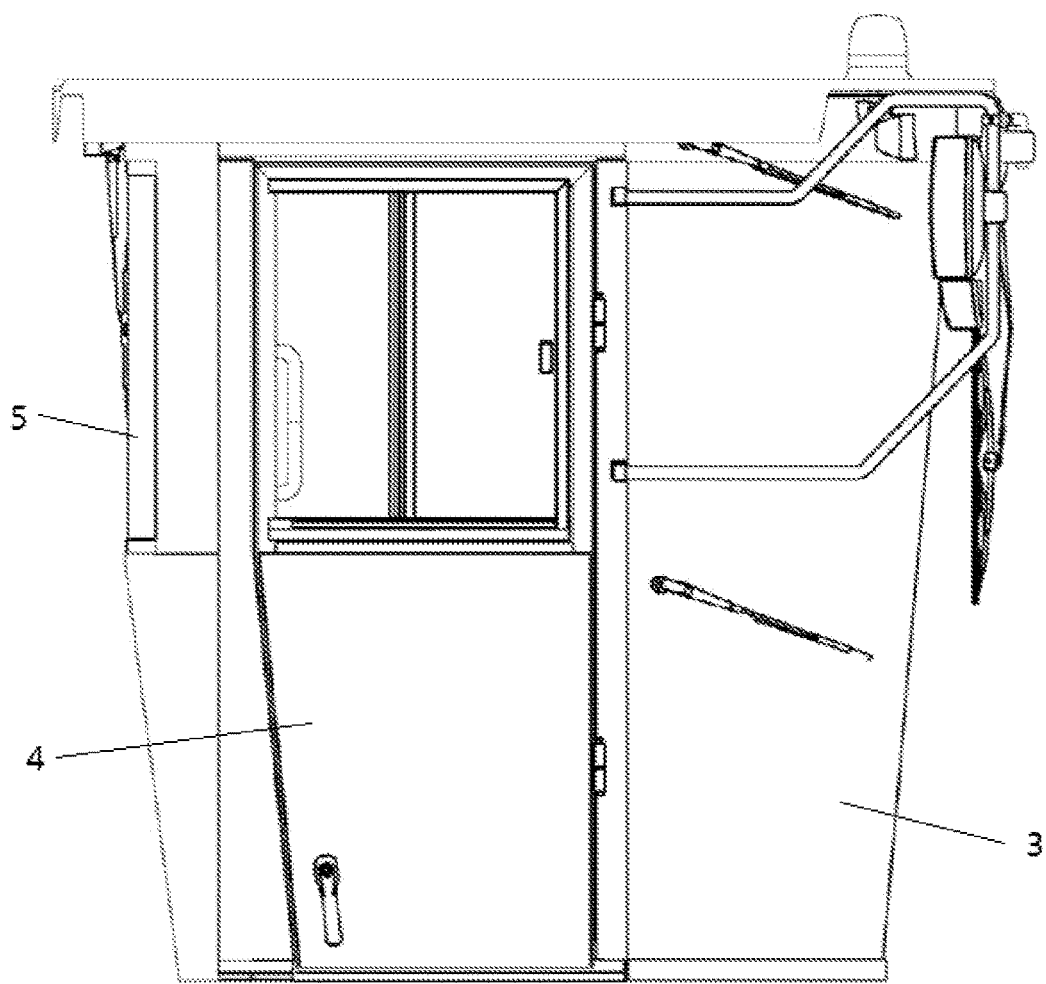
FIG. 4 illustrates a right view of the cab as shown in FIG. 1.

For one thing, as shown in FIGS. 1 and 4, in this embodiment, the front glass installation portion 14 forms an included angle with the vertical direction, instead of being arranged vertically. In one embodiment, the front glass installation portion 14 of this embodiment gradually inclines outwards in the bottom-to-top direction, that is, the front glass 3 installed on the front glass installation portion 14 gradually inclines outwards in the bottom-to-top direction. To make the front glass installation portion 14 gradually inclines outwards in the bottom-to-top direction, the front edge of the top frame 12 is arranged forward than the front edge of the bottom frame 11. Based on this, the front portion of the inner space of the cab 100 gradually increases from bottom to top.

Figure 9:
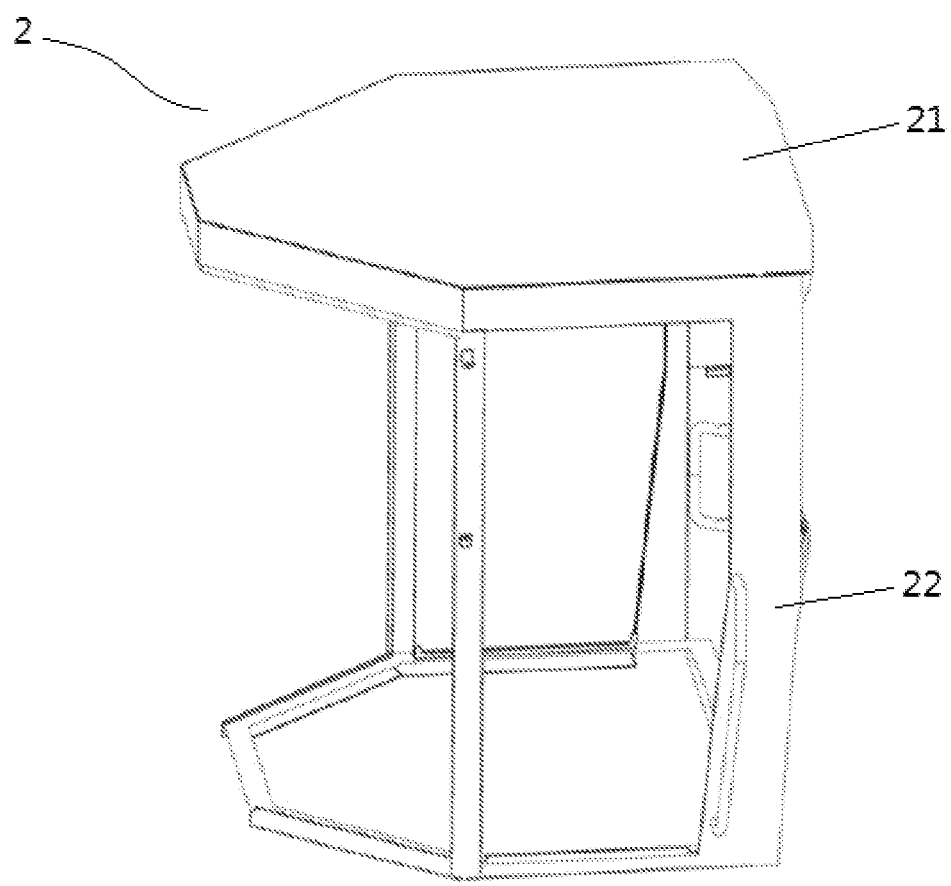
FIG. 9 illustrates a three-dimensional schematic diagram of an exterior skin as shown in FIG. 6.

For another thing, in this embodiment, as shown in FIGS. 6 and 9, the rear edge of the top skin portion 21 of the exterior skin 2 is arranged backward than that of the top frame 12, and the upper portion of the rear skin portion 22 of the exterior skin 2 is vertically arranged and the lower portion thereof inclines backwards in the bottom-to-top direction. Distinguished from the top frame 12 in the shape of a hexagon, the top skin portion 21 of this embodiment is in the shape of an octagon, and the octagon includes a trapezoid which is located at the front and tapers from back to front, a rectangle in the middle, and a trapezoid which is located at the rear and tapers from front to back.

As the rear edge of the top frame 12 approximately flushes with that of the bottom frame 11 in the front-rear direction, the rear edge of the top skin portion 21 is arranged backward than that of the top frame 12, that is, the rear edge of the top skin portion 21 is arranged backward than that of the bottom frame 11, and the exterior skin 2 is no longer fitted onto the support framework 1, and the rear portion thereof protrudes backwards from the rear portion of the support framework 1, that is, there is a gap between the rear skin portion 22 and the rear upright columns 132 along the front-rear direction. With respect to a case that the rear skin portion 22 is fitted onto the rear upright columns 132, such configuration can increase the inner space of the cab frame 10 to make the interior of the cab 100 more spacious, which is which is convenient for the arrangement of the internal structural components and the driver's activities.

Furthermore, the upper portion of the rear skin portion 22 is vertically arranged and the lower portion thereof inclines backwards in the bottom-to-top direction, so that the rear portion of the inner space of the cab 100 is also a structure with a large upper portion and a small lower portion.

As can be seen, based on the above improvements in the support framework 1 and the exterior skin 2, the inner space of the cab frame 100 increases from bottom to top in both the forward and backward directions, so that the cab 100 has a smaller lower dimension and a larger upper dimension at the same time. For one thing, this reduces obstruction to the visual field by the baseplate; for another thing, this also provides sufficient movement space for an operator head, and meeting the demand of observing external circumstances by the driver or extending the driver head, and achieving a more comfortable operation process. At the same time, the rear skin portion 22 whose lower portion inclines backwards in the bottom-to-top direction can also avoid the rear hood of the cab and reducing interference between the cab 100 and the hood.

Figure 2:
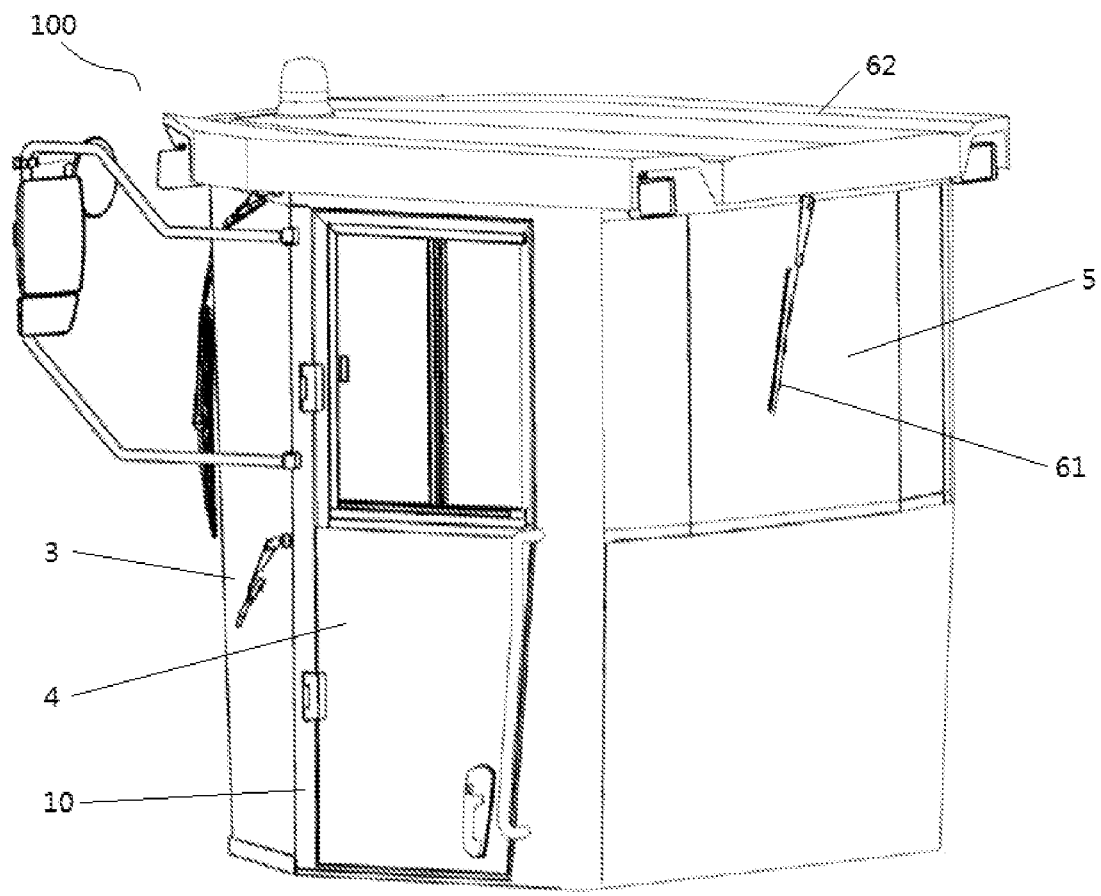
FIG. 2 illustrates a three-dimensional schematic diagram of another view angle of the cab as shown in FIG. 1.

In addition, as shown in FIG. 2, the rear skin portion 22 (specifically, the vertically arranged upper portion of the rear skin portion 22) of this embodiment is provided with a rear glass installation portion, and the rear glass 5 is installed on the rear glass installation portion. As the rear skin portion 22 protrudes backwards from the rear portion of the support framework 1, the rear glass 5 installed on the rear skin portion 22 also protrudes backwards from the rear portion of the support framework 1, which further increases the visual field of the rear portion of the cab 100 and helps the driver to observe the situation behind the cab 100.

As shown in FIG. 4, in this embodiment, the lower portion of the door 4 near the rear skin portion 22 is approximately parallel to the lower portion of the rear skin portion 22, and also incline backwards from bottom to top, so that the whole structure is more beautiful.

In addition, as shown in FIGS. 1-5, in this embodiment, the wiper structure includes six wipers, five wipers 61 are arranged on the front glass 3, and the rest one is arranged on the rear glass 5. The left front glass 32 and the right front glass 33 are respectively provided with two wipers 61, and two wipers 61 located on the left front glass 32 and two wipers 61 located on the right front glass 33 are respectively arranged in the up-down direction, one of which is located on the upper portion while the other one is located in the middle. Based on such arrangement, even in rainy days, the present disclosure also can provide the driver with good visual conditions and improve the safety of driving and operation.

From the above descriptions to the embodiments as shown in FIGS. 1-9, it can be seen that the cab 100 of this embodiment has a relatively wide visual field such as the visual field of the blade operating device and the visual field of forward movement, the inner space arrangement is reasonable, the head movement space of the operator is abundant, and the operation comfort is high, which is conducive to improving the operation efficiency and safety of the grader.

The foregoing embodiments are merely exemplary embodiments of the present disclosure, but are not intended to limit the present disclosure. Any modification, equivalent replacement, improvement, etc. made within the spirit and principle of the present disclosure should be included within the protection scope of the present disclosure.

What is claimed is:

1. A cab frame, comprising:
   a support framework comprising:
   a bottom frame;
   a top frame; and
   a four-upright-column structure supported between the bottom frame and the top frame, comprising two front upright columns and two rear upright columns, the two front upright columns are located between front and rear ends of the bottom frame, and no columns are provided in front of the two front upright columns, wherein the bottom frame and the top frame are not supported by a six-upright-column structure;
   wherein an internal dimension of the cab frame increases along a bottom-to-top direction;
   the cab frame comprising an exterior skin comprising at least one of the following:
   a top skin portion wrapped outside the top frame, a dimension of the top skin portion being larger than that of the bottom frame; and
   a rear skin portion wrapped outside a rear portion of the support framework, at least a lower portion of the rear skin portion inclining backwards in the bottom-to-top direction, and
   wherein a rear edge of the top skin portion is arranged more rearward than a rear edge of the bottom frame, and the rear edge of the top skin portion is arranged more rearward than a rear edge of the top frame, and the rear edge of the top frame approximately flushes with that of the bottom frame in a front-rear direction.

2. The cab frame according to claim 1, wherein the top frame is in a hexagonal shape, and the hexagonal shape comprises a trapezoid which is located at a front and tapers from a rear to a front, and a rectangle positioned at a rear, a top skin portion is in a shape of an octagon, and the octagon comprises a trapezoid which is located at a front and tapers from rear to front, a rectangle in a middle, and a trapezoid which is located at a rear and tapers from front to rear.

3. The cab frame according to claim 1, comprising a rear skin portion which is wrapped outside a rear portion of the support framework, and the rear skin portion protrudes backwards from the rear portion of the support framework.

4. The cab frame according to claim 3, wherein a rear glass installation portion is provided on the rear skin portion.

5. The cab frame according to claim 1, wherein the front upright columns are thinner than the rear upright columns.

6. The cab frame according to claim 1, wherein the bottom frame is a hexagonal shape, and the hexagonal shape comprises a trapezoid which is located at a front and tapers from rear to front and a rectangle at a rear; and the front upright columns are located on two middle vertices of the bottom frame.

7. The cab frame according to claim 1, comprising a front glass installation portion, the front glass installation portion is in front of the two front upright columns and extends from the top frame to the bottom frame in a height direction.

8. The cab frame according to claim 7, wherein the front glass installation portion gradually inclines outwards in the bottom-to-top direction.

9. The cab frame according to claim 7, wherein the bottom frame is in a hexagonal shape, and the hexagonal shape comprises a trapezoid which is located at a front and tapers from a rear to a front, and a rectangle positioned at a rear; the two front upright columns are located on two middle vertices of the bottom frame; the two rear upright columns are located on two rear vertices of the bottom frame; the front glass installation portion comprises a direct front glass installation portion, a left front glass installation portion and a right front glass installation portion, the direct front glass installation portion is located between two front vertices of the bottom frame, the left front glass installation portion and the right front glass installation portion are respectively located at left and right sides of the direct front glass installation portion and are both between the front vertices of a front upright column located at corresponding side and the bottom frame.

10. The cab frame according to claim 9, wherein along the bottom-to-top direction, a width of the direct front glass installation portion decreases gradually, and widths of the left front glass installation portion and right front glass installation portion increase gradually.

11. The cab frame according to claim 1, comprising door installation portion; the door installation portion comprises at least one of the following:
   a left door installation portion located between a front upright column on a left side and a rear upright column on a left side;
   a right door installation portion located between the front upright column on a left side and the rear upright column on a right side.

12. A cab, comprising:
   a cab frame, comprising:
   a support framework comprising:
   a bottom frame;
   a top frame; and a four-upright-column structure supported between the bottom frame and the top frame, comprising two front upright columns and two rear upright columns, the two front upright columns are located between front and rear ends of the bottom frame, and no columns are provided in front of the two front upright columns, wherein the bottom frame and top frame are not supported by a six-upright-column structure;

wherein an internal dimension of the cab frame increases along a bottom-to-top direction;

the cab frame comprising an exterior skin comprising at least one of the following:

a top skin portion wrapped outside the top frame, a dimension of the top skin portion being larger than that of the bottom frame; and a rear skin portion wrapped outside a rear portion of the support framework, at least a lower portion of the rear skin portion inclining backwards in the bottom-to-top direction; and wherein a rear edge of the top skin portion is arranged more rearward than a rear edge of the bottom frame, and the rear edge of the top skin portion is arranged more rearward than a rear edge of the top frame, and the rear edge of the top frame approximately flushes with that of the bottom frame in a front-rear direction.

13. The cab according to claim 12, comprising a front glass, the front glass comprises a direct front glass, a left front glass and a right front glass, the direct front glass is installed on a direct front glass installation portion of a front glass installation portion of the cab frame, the left front glass is installed on a left front glass installation portion of the front glass installation portion, and the right front glass is installed on a right front glass installation portion of the front glass installation portion, and the cab further comprises a wiper structure with at least one of the following: two wipers arranged on the left front glass; two wipers arranged on the right front glass.

14. An engineering vehicle, comprising:

a cab, comprising:

a cab frame, comprising:

a support framework comprising:

a bottom frame;

a top frame; and a four-upright-column structure supported between the bottom frame and the top frame, comprising two front upright columns and two rear upright columns, the two front upright columns are located between front and rear ends of the bottom frame, and no columns are provided in front of the two front upright columns, wherein the bottom frame and top frame are not supported by a six-upright-column structure;

wherein an internal dimension of the cab frame increases along a bottom-to-top direction;

the cab frame comprising an exterior skin comprising at least one of the following:

a top skin portion wrapped outside the top frame, a dimension of the top skin portion being larger than that of the bottom frame; and a rear skin portion wrapped outside a rear portion of the support framework, at least a lower portion of the rear skin portion inclining backwards in the bottom-to-top direction; and wherein a rear edge of the top skin portion is arranged more rearward than a rear edge of the bottom frame, and the rear edge of the top skin portion is arranged more rearward than a rear edge of the top frame, and the rear edge of the top frame approximately flushes with that of the bottom frame in a front-rear direction.

15. The engineering vehicle according to claim 14, wherein the engineering vehicle is a grader.

* * * * *